United States Patent
Hsiang

(10) Patent No.: US 10,237,557 B2
(45) Date of Patent: Mar. 19, 2019

(54) METHOD OF RUN-LENGTH CODING FOR PALETTE PREDICTOR

(71) Applicant: HFI Innovation Inc., Zhubei, Hsinchu County (TW)

(72) Inventor: Shih-Ta Hsiang, New Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 107 days.

(21) Appl. No.: 15/175,444

(22) Filed: Jun. 7, 2016

(65) Prior Publication Data

US 2016/0286217 A1 Sep. 29, 2016

Related U.S. Application Data

(63) Continuation-in-part of application No. PCT/CN2015/081751, filed on Jun. 18, 2015.

(60) Provisional application No. 62/173,035, filed on Jun. 9, 2015, provisional application No. 62/021,287, filed on Jul. 7, 2014, provisional application No. 62/020,518, filed on Jul. 3, 2014, provisional application No. 62/017,401, filed on Jun. 26, 2014, provisional application No. 62/014,970, filed on Jun. 20, 2014.

(51) Int. Cl.
| H04N 19/13 | (2014.01) |
| H04N 19/51 | (2014.01) |
| H04N 19/176 | (2014.01) |
| H04N 19/70 | (2014.01) |
| H04N 19/124 | (2014.01) |

(52) U.S. Cl.
CPC ........... *H04N 19/13* (2014.11); *H04N 19/176* (2014.11); *H04N 19/51* (2014.11); *H04N 19/70* (2014.11); *H04N 19/124* (2014.11)

(58) Field of Classification Search
CPC ...... H04N 19/13; H04N 19/176; H04N 19/51; H04N 19/70; H04N 19/124
USPC ..................................... 375/240.12
See application file for complete search history.

(56) References Cited

U.S. PATENT DOCUMENTS

| 2015/0264363 A1* | 9/2015 | Pu ................. H04N 19/186 |
| | | 375/240.02 |
| 2016/0323591 A1* | 11/2016 | Chuang ............ H04N 19/197 |
| 2017/0019677 A1* | 1/2017 | Sun ................. H04N 19/593 |

* cited by examiner

*Primary Examiner* — William C Vaughn, Jr.
*Assistant Examiner* — Jae N Noh
(74) *Attorney, Agent, or Firm* — Oblon, McClelland, Maier & Neustadt, L.L.P.

(57) ABSTRACT

Methods and apparatus of palette coding based on a palette predictor in a video coding system are disclosed. A set of run lengths associated with re-use flags of a current palette with respect to a palette predictor is determined and the set of run lengths includes an Escape code to indicate an end of run length coding for the re-use flags of the current palette. A set of code values is determined for the set of run lengths by adaptively assigning an Escape code value to the Escape code depending on a current index of predictor run length coding. The set of run lengths is then encoded or decoded according to the set of code values. According to another method, a context model is determined for at least a portion of the binary string depending on current coding information, previous coding information or both.

12 Claims, 4 Drawing Sheets

METHOD OF RUN-LENGTH CODING FOR PALETTE PREDICTOR

CROSS REFERENCE TO RELATED APPLICATIONS

The present invention is a continuation-in-part of and claims priority to PCT Patent Application, Ser. No. PCT/CN2015/081751, filed on Jun. 18, 2015, which claims priority to U.S. Provisional Patent Application Ser. No. 62/014,970, filed on Jun. 20, 2014, U.S. Provisional Patent Application Ser. No. 62/017,401, filed on Jun. 26, 2014, U.S. Provisional Patent Application Ser. No. 62/020,518, filed on Jul. 3, 2014 and U.S. Provisional Patent Application Ser. No. 62/021,287, filed on Jul. 7, 2014. The present invention also claims priority to U.S. Provisional Patent Application, Ser. No. 62/173,035, filed on Jun. 9, 2015. The PCT Patent Application and U.S. Provisional Patent Applications are hereby incorporated by reference in their entireties.

FIELD OF THE INVENTION

The present invention relates to entropy coding for syntax related to video coding. In particular, the present invention relates to techniques of binarization and context-adaptive coding of syntax related to run length of palette predictors in screen content coding.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

FIG. 1 illustrates an exemplary adaptive Inter/Intra video coding system according to HEVC standard. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data are stored in Reference Picture Buffer 134 and used for prediction of other frames. However, deblocking filter 130 and other in-loop filter 132 (i.e., sample adaptive offset, SAO) are applied to the reconstructed video data before the video data are stored in the reference picture buffer.

Context-based adaptive binary arithmetic coding (CABAC) is a high efficiency entropy coding tool that has been widely used in advanced video coding such as H.264 and HEVC. For example, various syntax elements of the HEVC standard are coded in the CABAC mode, where entropy coding is applied to the binarized syntax elements adaptively based on context associated with an underlying syntax element. FIG. 2 illustrates an exemplary block diagram of the CABAC process. Since the arithmetic coder in the CABAC engine can only encode the binary symbol values, the CABAC process needs to convert the values of the syntax elements into a binary string using a binarizer (210). The conversion process is commonly referred to as binarization. During the coding process, the probability models are gradually built up from the coded symbols for the different contexts. The context modeler (220) serves the modelling purpose. During normal context based coding, the regular coding engine (230) is used, which corresponds to a binary arithmetic coder. The selection of the modelling context for coding the next binary symbol can be determined by the coded information. Symbols can also be encoded without the context modelling stage and assume an equal probability distribution, commonly referred to as the bypass mode, for reduced complexity. For the bypassed symbols, a bypass coding engine (240) may be used. As shown in FIG. 2, switches (S1, S2 and S3) are used to direct the data flow between the regular CABA mode and the bypass mode. When the regular CABAC mode is selected, the switches are flipped to the upper contacts. When the bypass mode is selected, the switches are flipped to the lower contacts as shown in FIG. 2

The JCT standardization body is currently in the process of developing the HEVC screen content coding (SCC) extension. In contrast to the conventional natural video with a continuous color tone, the screen content video often contain a few pilot colors and sharp edges and boundaries. A palette coding has thus been developed for HEVC SCC, as defined in JCTVC-T1005 (Joshi, et al., *HEVC Screen Content Coding Draft Text* 3, Joint Collaborative Team on Video Coding (JCT-VC) of ITU-T SG 16 WP 3 and ISO/IEC JTC 1/SC 29/WG 11, 20th Meeting: Geneva, CH, 10-18 February 2015, Document: JCTVC-T1005).

In the current the HEVC SCC draft as defined in JCTVC-T1005, when the palette mode is selected to code a CU, a set of palette colors are employed to represent the pixel sample values in the CU. The set of palette colors is also called a palette table or simply a palette. The colors in the palette table are referenced by palette index values. A palette table has to be used for each CU, which will result in substantial amount data to be transmitted. In order to reduce the required data transmission associated with the palette table, the palette color values in the current CU are predicted from a set of palette predictors built from the previously coded CUs. For each palette entry, a binary flag (i.e., PalettePredictorEntryReuseFlag) is employed to indicate whether this palette color is re-used in the current CU.

FIG. 3 illustrates an example of palette predictor update process. The current palette prediction 310 comprises color indices and associated colors. Furthermore, there is a reuse flag field 320 associated with the palette predictor to indicate whether a color of the predictor is used by the current palette table 330. In this example, only two colors in the predictor are used by the current CU (i.e., colour$_0$ and colour$_2$). There are $N_{new}$ new colors (340) in the current CU. To update the palette predictor, the colors in the buffer need to be reordered to generate the updated palette predictor 350.

The values of PalettePredictorEntryReuseFlag are coded by run length coding in order of the predictor index values. The re-use flags are represented in run-lengths, where each run length indicates the number of the consecutive re-use flags with PalettePredictorEntryReuseFlag equal to 0. FIG. 4 illustrates an example of run-length coding for palette reuse flags, where an Escape code with the value equal to 1 is used to indicate the last zero-run, and run-length values for zero-runs having run-length values equal to or larger than the EC code value are increased by 1. The coded run length are binarized using the Ex-Golomb Rice code with K=0.

It is desirable to develop methods for further improving the coding efficiency associated with the run length associated with the re-use flags.

BRIEF SUMMARY OF THE INVENTION

Methods and apparatus of palette coding based on a palette predictor in a video coding system are disclosed. According to this method, a set of run lengths associated with re-use flags of a current palette with respect to a palette predictor is determined. The set of run lengths includes an Escape code to indicate an end of run length coding for the re-use flags of the current palette. A set of code values is determined for the set of run lengths by adaptively assigning an Escape code value to the Escape code depending on a current index of predictor run length coding. The set of run lengths is then encoded or decoded according to the set of code values. The Escape code value assigned to the Escape code can further depend on a number of palette colors in a previous block coded in a palette mode according to one embodiment. For example, a value of two can be assigned to the Escape code if the current index of predictor run length coding is less than a total number of palette colors in a previous block coded in the palette mode, and a value of one is assigned to the Escape code otherwise.

According to another method of the present invention, a current coding symbol associated with palette coding of a current palette of a palette-coded block is binarized into a binary string. A context model is determined for at least a portion of the binary string depending on current coding information, previous coding information or both. Context-adaptive coding is then applied to at least a portion of the binary string using the context model. The context may depend on the current bin index of the binary string according to one embodiment. For example, the at least a portion of the binary string may correspond to prefix bins of the binary string and the context-adaptive coding uses a regular mode if the current bin index of the binary string is less than a threshold and uses a bypass mode otherwise. The context model for the at least a portion of the binary string may further depend on the current predictor index. For example, for the current bin index being equal to zero, multiple contexts may be selected based on the current predictor index. In this case, a same palette coding module can be used for the context-adaptive coding with multiple contexts. The context model for the at least a portion of the binary string may also depend on the current predictor index independent of the current bin index. The context model for the at least a portion of the binary string may also depend on the total number of palette colors in a previous block coded in the palette mode.

DETAILED DESCRIPTION OF THE INVENTION

Figure 1:
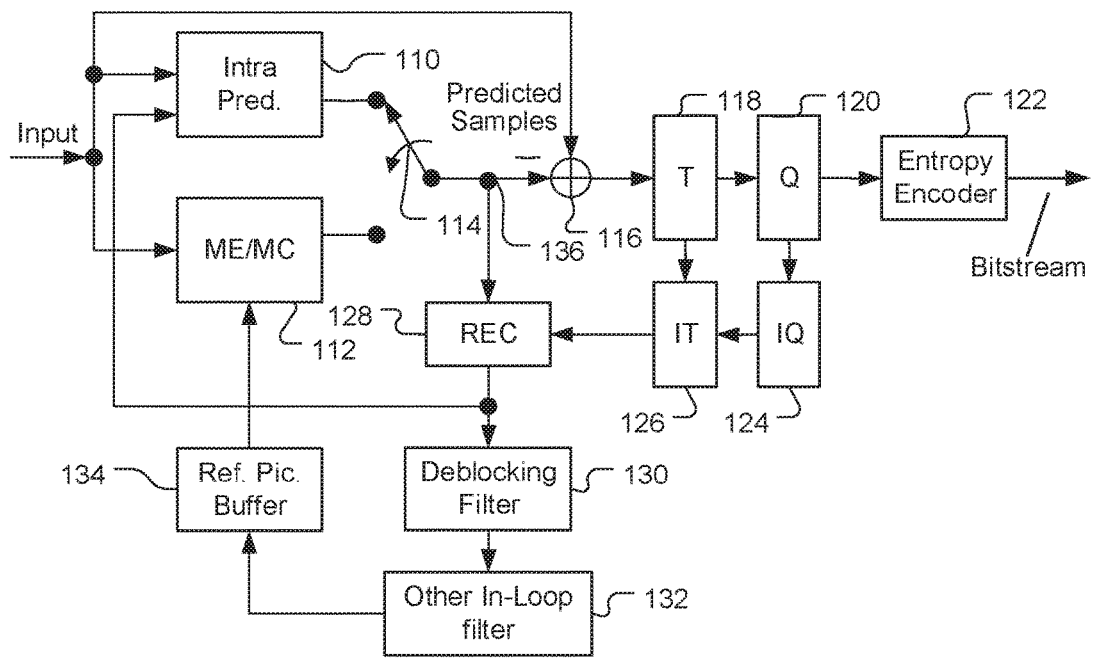
FIG. 1 illustrates an exemplary adaptive Inter/Intra video encoding system using transform, quantization and loop processing according to the HEVC (high efficiency video coding) standard.
Figure 2:
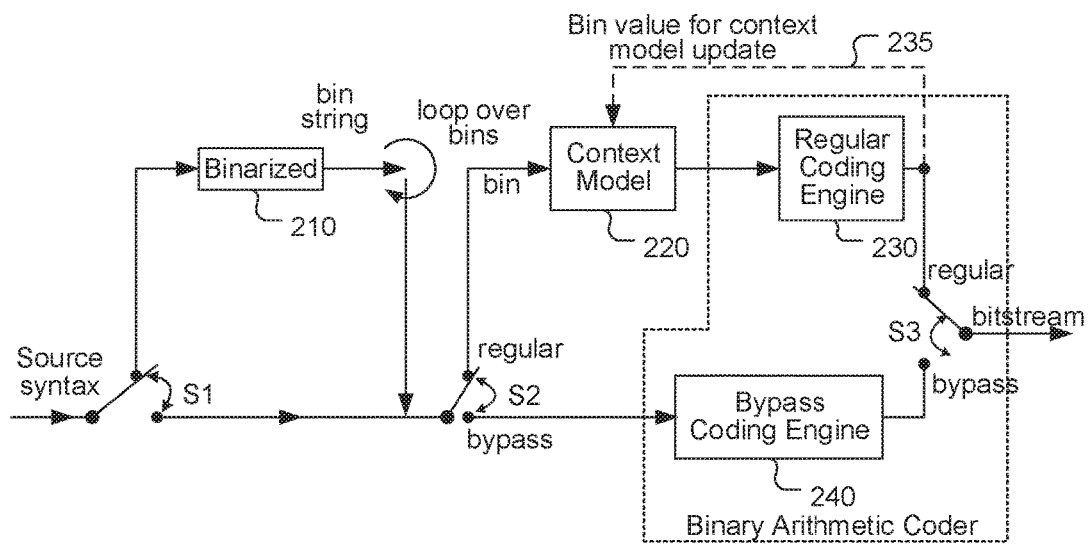
FIG. 2 illustrates an exemplary block diagram for CABAC (context-adaptive binary arithmetic coding), where a source syntax can be adaptively coded using a regular CABAC mode or a bypass mode.
Figure 3:
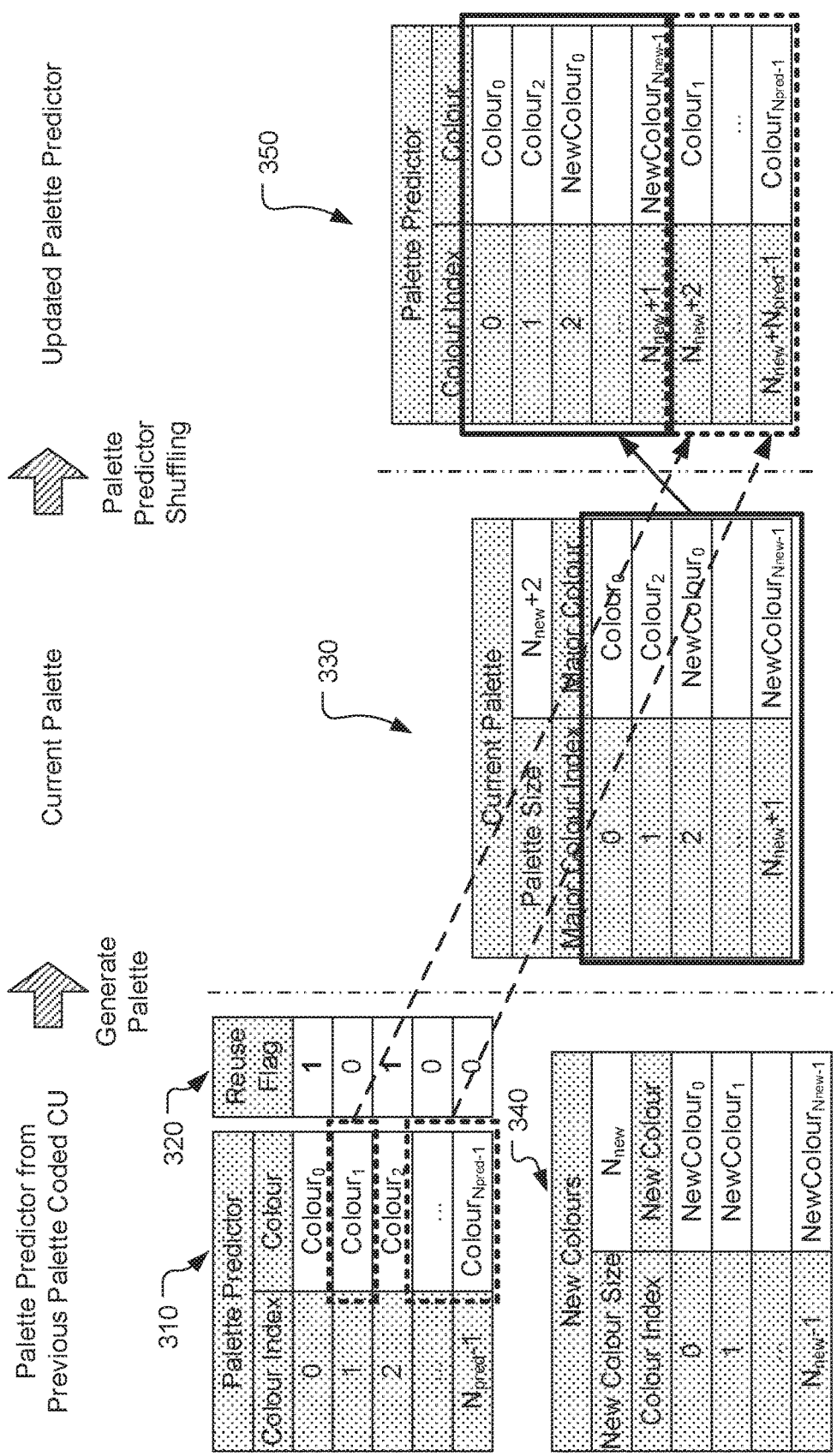
FIG. 3 illustrates an example of palette predictor update process, where the contents of the palette predictor stored in a buffer are re-ordered.

The following description is of the best-contemplated mode of carrying out the invention. This description is made for the purpose of illustrating the general principles of the invention and should not be taken in a limiting sense. The scope of the invention is best determined by reference to the appended claims.

The present invention discloses several methods for further improving the efficiency of run length coding for the palette predictor re-use flags.

First Method: Two-part Codeword Consisting of MSB and Refinement Bits Part

This invention utilizes a universal method for coding information on the palette predictor run length, related to syntax palette_predictor_run define in JCTVC-T1005. The first method represents an unsigned source symbol by signaling the most significant bit (MSB) index and the refinement bits of its value in a binary form. The MSB index for value 0 is assigned to −1. The resulting codeword is a concatenation of a prefix part and a suffix part. The prefix part represents the MSB index of a symbol value plus 1, denoted by msb_id_plus1, in a unary code, or a truncated unary code if the maximal syntax value is known. The syntax element msb_id_plus1 for an unsigned symbol x is given by:

$$\text{msb\_id\_plus1} = \begin{cases} \text{floor}(\log 2(x)) + 1, & \text{if } x > 0; \\ 0, & \text{otherwise.} \end{cases} \quad (1)$$

The suffix bin part represents the refinement bits and is present if msb_id_plus1>1. The value of refinement bits, denoted by refinement_bits, is binarized by a fixed-length binary code with the string length equal to msb_id_plus1−1 or a truncated binary code if the maximal syntax value is known. The decoded syntax value x is given by $$x = \begin{cases} (1 \ll (msb\_id\_plus1 - 1)) + refinement\_bits & \text{if } msb\_id\_plus1 > 1; \\ 0, & \text{otherwise.} \end{cases} \quad (2)$$

Table 1 illustrates an example of the codeword bin strings (also termed as binary strings) corresponding to symbol values 0-31 according to the binarization process incorporating an embodiment of the present invention. The msb_id_plus1 values are derived according to equation (1). The length of refinement bits is determined according to (msb_id_plus1−1). The binarization process according to the present invention may also be applied to signed source symbols by applying the above binarization process to the absolute value of the signed symbol value plus sign information. Furthermore, the binarization process can be applied to multi-dimensional source data such as vectors by using the binarization process to each vector component.

TABLE 1

| x | x in binary | msb_id_plus1 | refinement bins |
|---|---|---|---|
| 0 | 0 | 0 | — |
| 1 | 1 | 10 | — |
| 2 | 10 | 110 | 0 |
| 3 | 11 | 110 | 1 |
| 4 | 100 | 1110 | 00 |
| 5 | 101 | 1110 | 01 |
| 6 | 110 | 1110 | 10 |
| 7 | 111 | 1110 | 11 |
| 8-15 | 1000-1111 | 11110 | 000-111 |
| 16-31 | 10000-11111 | 111110 | 0000-1111 |

In one embodiment, this method is applied to coding the palette predictor run length using the truncated unary code for the prefix part and the truncated binary code for the suffix part with the maximum symbol value derived from the predictor size and the number of the remaining predictors.

Second Method: Adaptive Escape Code

The conventional method of run length coding of palette predictor re-use flags as described in JCTVC-T1005 utilizes a special escape codeword to indicate the end of the run length coding and the remaining un-coded predictor re-use flags are all set equal to 0. In this way, the syntax value greater or equal to the escape symbol value is coded as the syntax value plus 1. In order to improve the coding efficiency for the palette predictor re-use flags, the second method selects the escape symbol value adaptively. In one embodiment, the escape symbol value is dependent on the current index of the predictor run length coding. In another embodiment, the escape symbol value is dependent on the current index of the predictor run length coding and the number of the pallet colors in the previous CU coded in the palette mode. In yet another embodiment, the escape symbol value is equal to 2 if the current index is less than the number of the pallet colors in the previous CU coded in the palette mode and equal to 1 otherwise.

Third Method: Context Modeling

According to the third method, a plurality of bins from the binarized symbol value can be coded in the regular CABAC mode using context-based adaptive binary arithmetic coding (CABAC). In one embodiment, context selection is dependent on the current bin index of the binarized symbol value. Therefore, context selection can be determined by the index of the prefix bin string. For example, regular CABAC mode can be applied to bin indices smaller than or equal to 3 and bypass mode can be applied to bin indices greater than 3. In another embodiment, context selection is further dependent on the current predictor index. Palette predictors with lower index values are more often re-used. For example, context selection can be further conditioned on the position of the predictor index for bin index 0. For example, context index is equal to 0 (i.e., ctxInc=0) for predictor index <T1, ctxInc is equal to 1 for T1<=predictor index <T2, and ctxInc is equal to 2 for predictor index <T1, where T1 and T2 are thresholds and T2>T1. The current module for palette index run-length coding can be re-used, but with a separate set of contexts. For example, the same bypass threshold can be used or the palette index can be replaced with the predictor index for bin index 0.

In another embodiment, context selection is further dependent on the number of the palette colors in the previous CU coded in the palette mode. For example, palette predictors from the previous palette CU are more often re-used. In another embodiment, context selection is further dependent on the last coded run length value. In another embodiment, the run length symbol length is coded by the proposed binarization method. The prefix bins with bin index less than a threshold T is coded in the regular mode and in the bypass mode otherwise. One example of context selection is provided in Table 2.

TABLE 2

Example of mapping table for context selection

| bin index | 0 | 1 | 2 | 3 | 4 | >4 |
|---|---|---|---|---|---|---|
| predictor index < # of palettes in previous Palette CU | 0 | 1 | 2 | 3 | 4 | bypass |
| predictor index >= # of palettes in previous Palette CU | 5 | 6 | 2 | 3 | 4 | bypass |

Figures 4, 5:
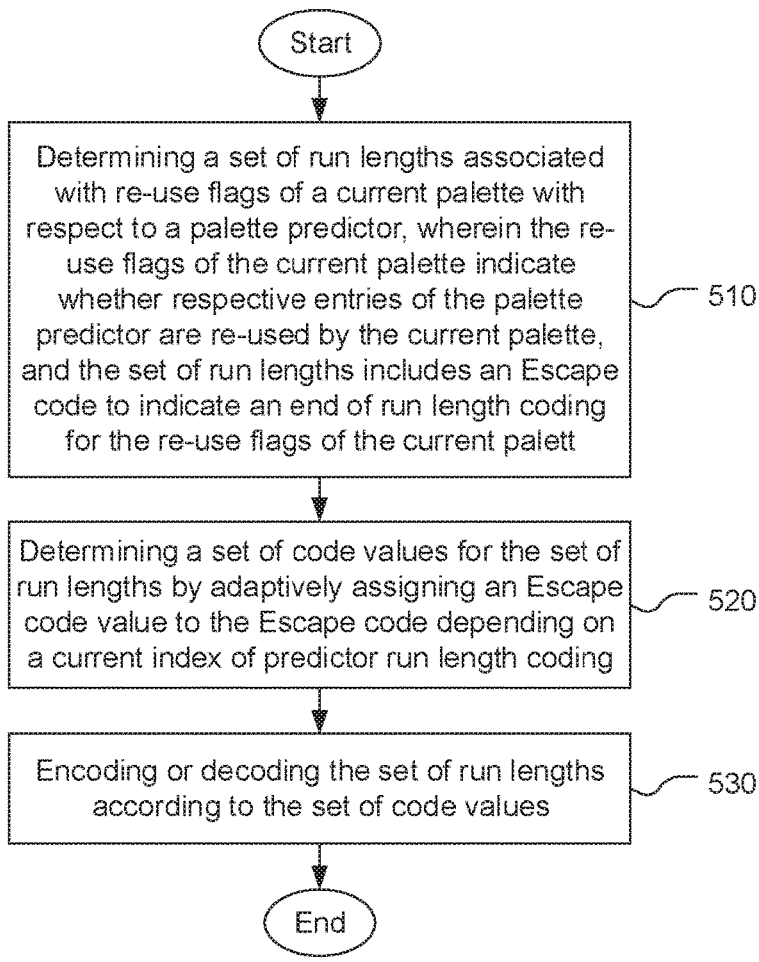
FIG. 4 illustrates an example of run-length coding of palette re-use flags, where an Escape code with the value equal to 1 is used to indicate the last zero-run, and run-length values for zero-runs having run-length values equal to or larger than the EC code value are increased by 1.
FIG. 5 illustrates an exemplary flowchart of palette coding based on a palette predictor according to an embodiment of the present invention, where an Escape code is used to indicate an end of run length coding for the re-use flags and the Escape code value assigned to the Escape code depends on the current index of predictor run length coding.

FIG. 5 illustrates an exemplary flowchart of palette coding based on a palette predictor according to an embodiment of the present invention, where an Escape code is used to indicate an end of run length coding for the re-use flags and the Escape code value assigned to the Escape code depends on the current index of predictor run length coding. In step 510, a set of run lengths associated with re-use flags of a current palette with respect to a palette predictor is determined. The re-use flags of the current palette indicate whether respective entries of the palette predictor are re-used by the current palette, and the set of run lengths includes an Escape code to indicate an end of run length coding for the re-use flags of the current palette. A set of code values for the set of run lengths is determined by adaptively assigning an Escape code value to the Escape code depending on a current index of predictor run length coding in step 520. The set of run lengths is then encoded or decoded according to the set of code values in step 530.

Figure 6:
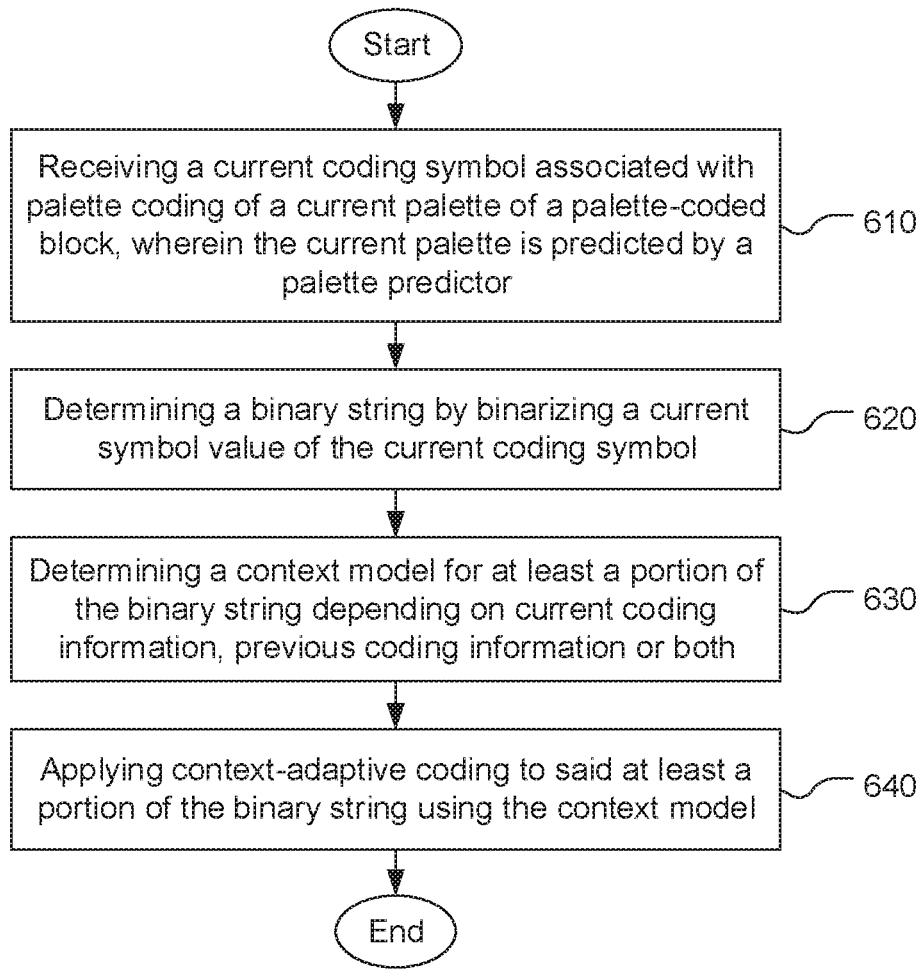
FIG. 6 illustrates an exemplary flowchart of entropy coding for coding symbols generated in a video coding system using a palette mode according to an embodiment of the present invention, where at least a part of the binary string corresponding to the current symbol value of the current coding symbol uses a context model depending on the current coding information, previous coding information or both.

FIG. 6 illustrates an exemplary flowchart of entropy coding for coding symbols generated in a video coding system using a palette mode according to an embodiment of the present invention, where at least a part of the binary string corresponding to the current symbol value of the current coding symbol uses a context model depending on the current coding information, previous coding information or both. In step 610, receiving a current coding symbol associated with palette coding of a current palette of a palette-coded block, wherein the current palette is predicted by a palette predictor. A binary string is determined by binarizing a current symbol value of the current coding symbol in step 620. A context model is determined for at least a portion of the binary string depending on current coding information, previous coding information or both in step 630. Context-adaptive coding is applied to at least a portion of the binary string using the context model in step 640.

The flowcharts shown above are intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of entropy coding for coding symbols generated in a video coding system using a palette mode, the method comprising:

receiving a current coding symbol associated with a current color index in a current palette of a current palette-coded block, wherein the current palette is derived from a palette predictor that is generated based on a previous palette of a previous palette-coded block;

determining a binary string by binarizing a current symbol value of the current coding symbol;

determining, by a processing circuit of a coding apparatus, a context model for a particular bin of the binary string from a first set of context models based on a first context model assignment when the current color index is less than a threshold, wherein the threshold corresponds to a total number of palette colors in the previous palette;

determining, by the processing circuit of the coding apparatus, the context model for the particular bin of the binary string from a second set of context models based on a second context model assignment when the current color index is not less than the threshold, the first set of context models and the second set of context models being different; and applying context-adaptive coding to the particular bin of the binary string using the determined context model.

2. The method of claim 1, wherein the determining the context model for the particular bin of the binary string from the first set of context models is performed based on the first context model assignment and a bin index of the particular bin of the binary string.

3. The method of claim 1, wherein
the particular bin of the binary string corresponds to one of prefix bins of the binary string.

4. The method of claim 1, wherein
a bin index of the particular bin of the binary string is zero, and
the determined context model for the particular bin of the binary string when the current color index is less than the total number of palette colors in the previous palette is different from the determined context model for the particular bin of the binary string when the current color index is not less than the total number of palette colors in the previous palette.

5. An apparatus of entropy coding for coding symbols generated in a video coding system using a palette mode, the apparatus comprising one or more electronic circuits or processors configured to:

receive a current coding symbol associated with a current color index in a current palette of a current palette-coded block, wherein the current palette is derived from a palette predictor that is generated based on a previous palette of a previous palette-coded block;

determine a binary string by binarizing a current symbol value of the current coding symbol;

determine a context model for a particular bin of the binary string from a first set of context models based on a first context model assignment when the current color index is less than a threshold, wherein the threshold corresponds to a total number of palette colors in the previous palette;

determine the context model for the particular bin of the binary string from a second set of context models based on a second context model assignment when the current color index is not less than the threshold, the first set of context models and the second set of context models being different; and apply context-adaptive coding to the particular bin of the binary string using the determined context model.

6. The apparatus of claim 5, wherein the one or more electronic circuits or processors are configured to determine the context model for the particular bin of the binary string from the first set of context models based on the first context model assignment and a bin index of the particular bin of the binary string.

7. The apparatus of claim 5, wherein the particular bin of the binary string corresponds to one of prefix bins of the binary string.

8. The apparatus of claim 5, wherein a bin index of the particular bin of the binary string is zero, and the determined context model for the particular bin of the binary string when the current color index is less than the total number of palette colors in the previous palette is different from the determined context model for the particular bin of the binary string when the current color index is not less than the total number of palette colors in the previous palette.

9. The apparatus of claim 5, wherein the one or more electronic circuits or processors are configured to apply a bypass mode coding on another bin of the binary string that has another bin index greater than a threshold.

10. The apparatus of claim 5, wherein the one or more electronic circuits or processors are configured to:

determine run-length values of reuse flags of the palette predictor, the current coding symbol representing one of the run-length values of the reuse flags of the palette predictor.

11. The method of claim 1, further comprising:

applying a bypass mode coding on another bin of the binary string that has another bin index greater than a threshold.

12. The method of claim 1, further comprising:

determining run-length values of reuse flags of the palette predictor, the current coding symbol representing one of the run-length values of the reuse flags of the palette predictor.

* * * * *